(12) United States Patent
Kazmi et al.

(10) Patent No.: US 10,327,282 B2
(45) Date of Patent: Jun. 18, 2019

(54) NETWORK NODE, A WIRELESS DEVICE AND METHODS THEREIN FOR SELECTING A COMMUNICATION MODE IN A WIRELESS COMMUNICATIONS NETWORK

(71) Applicant: Telefonaktiebolaget LM Ericsson (publ), Stockholm (SE)

(72) Inventors: Muhammad Kazmi, Sundbyberg (SE); Gabor Fodor, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/541,915

(22) PCT Filed: Jan. 8, 2015

(86) PCT No.: PCT/SE2015/050006
§ 371 (c)(1),
(2) Date: Jul. 6, 2017

(87) PCT Pub. No.: WO2016/111638
PCT Pub. Date: Jul. 14, 2016

(65) Prior Publication Data
US 2018/0007724 A1      Jan. 4, 2018

(51) Int. Cl.
*H04W 8/00*      (2009.01)
*H04W 92/18*      (2009.01)
(Continued)

(52) U.S. Cl.
CPC ............. *H04W 92/18* (2013.01); *H04W 4/70* (2018.02); *H04W 8/005* (2013.01); *H04W 76/14* (2018.02); *H04W 28/18* (2013.01)

(58) Field of Classification Search
CPC ... H04W 76/023; H04W 92/18; H04W 4/005; H04W 8/005; H04W 4/70; H04W 76/14; H04W 28/18
(Continued)

(56) References Cited

U.S. PATENT DOCUMENTS

| 2004/0121790 A1* | 6/2004 | Wolff | ............... G06F 17/30746 |
| | | | 455/518 |
| 2012/0195237 A1* | 8/2012 | Chan | ....................... H04B 1/44 |
| | | | 370/278 |

(Continued)

FOREIGN PATENT DOCUMENTS

| EP | 2438692 B1 | 8/2014 |
| GB | 2497937 A | 7/2013 |

OTHER PUBLICATIONS

3GPP, "3rd Generation Partnership Project; Technical Specification Group Services and System Aspects; Feasibility study for Proximity Services (ProSe) (Release 12)", 3GPP TR 22.803 V12.2.0, Jun. 2013, 1-45.

(Continued)

*Primary Examiner* — Faisal Choudhury
(74) *Attorney, Agent, or Firm* — Sage Patent Group

(57) ABSTRACT

Embodiments herein relate to a method performed by a network node (110) for selecting a communication mode in a wireless communications network (100). The network node (110) obtains information about a first and a second wireless device (121, 122) in the wireless communications network (100) indicating that the first and the second wireless device (121, 122) are capable of communicating using any one of a set of at least three communication modes comprising at least a cellular communication mode, a Device-to-Device, D2D, half-duplex communication mode, and a D2D full-duplex communication mode. Also, the network node (110) selects, from the set of at least three (Continued)

communication modes, one of the communication modes for a communication between the first and second wireless devices (121, 122) when at least one criterion on a capability of the first and second wireless device (121) associated with one of the communication modes is met, and/or at least one criterion on an operational capability of the network node (110) associated with one of the communication modes is met. Then, the network node (110) transmits information about the selected communication mode for the communication between the first and second wireless devices (121, 122) to at least the first wireless device (121). Embodiments of the network node (110) are also described. Furthermore, embodiments herein further relate to a wireless device (110) and method therein for selecting a communication mode for a communication with a second wireless device (122) in a wireless communications network (100).

42 Claims, 6 Drawing Sheets

(51) Int. Cl.
*H04W 4/00* (2018.01)
*H04W 4/70* (2018.01)
*H04W 76/14* (2018.01)
*H04W 28/18* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2013/0114468 | A1* | 5/2013 | Hui | H01Q 3/2611 |
| | | | | 370/277 |
| 2013/0194984 | A1* | 8/2013 | Cheng | H04W 72/082 |
| | | | | 370/294 |
| 2013/0254277 | A1 | 9/2013 | Vasudevan et al. | |
| 2014/0274066 | A1 | 9/2014 | Fodor et al. | |
| 2015/0016309 | A1* | 1/2015 | Fang | H04L 5/14 |
| | | | | 370/277 |
| 2015/0382392 | A1* | 12/2015 | Morita | H04W 76/14 |
| | | | | 370/329 |
| 2016/0044669 | A1* | 2/2016 | Yoon | H04W 76/14 |
| | | | | 370/336 |
| 2017/0302337 | A1* | 10/2017 | Liu | H04B 7/005 |

OTHER PUBLICATIONS

Doppler, Klaus et al., "Mode selection for Device-to-Device Communication underlaying an LTE-Advanced Network", 2010 IEEE Wireless Communication and Networking Conference (WCNC) Sydney, Australia, Apr. 18-21, 2010, 1-6.

* cited by examiner

US 10,327,282 B2

NETWORK NODE, A WIRELESS DEVICE AND METHODS THEREIN FOR SELECTING A COMMUNICATION MODE IN A WIRELESS COMMUNICATIONS NETWORK

TECHNICAL FIELD

Embodiments herein relate to modes of communication in a wireless communications network. In particular, embodiments herein relate to a network node and method therein for selecting a communication mode in a wireless communications network, and to a wireless device and method therein for selecting a communication mode for a communication with a second wireless device in a wireless communications network.

BACKGROUND

In a typical wireless communications network, wireless devices, also known as mobile stations, terminals, and/or User Equipments, UEs, communicate via a Radio Access Network, RAN, with one or more core networks. The RAN covers a geographical area which is divided into cells, with each cell being served by a base station, e.g. a radio base station, RBS, or network node, which in some networks may also be called, for example, a "NodeB", "eNodeB", "eNB" or Access Point, AP. A cell is a geographical area where radio coverage is provided by the radio base station at a base station site or an antenna site in case the antenna and the radio base station are not collocated. One radio base station may, however, serve one or more cells. The base stations communicate over the air interface which may also be called radio interface operating on radio frequencies with the wireless devices within range of the base stations.

A Universal Mobile Telecommunications System, UMTS, is a third generation mobile communication system, which evolved from the second generation, 2G, Global System for Mobile Communications, GSM. The UMTS terrestrial radio access network, UTRAN, is essentially a RAN using wideband code division multiple access, WCDMA, and/or High Speed Packet Access, HSPA, for user equipments. In a forum known as the Third Generation Partnership Project, 3GPP, telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller, RNC, or a base station controller, BSC, which supervises and coordinates various activities of the plural base stations connected thereto. The RNCs are typically connected to one or more core networks.

Specifications for the Evolved Packet System, EPS, have been completed within the 3$^{rd}$ Generation Partnership Project, 3GPP, and this work continues in the coming 3GPP releases. The EPS comprises the Evolved Universal Terrestrial Radio Access Network, E-UTRAN, also known as the Long Term Evolution, LTE, radio access, and the Evolved Packet Core, EPC, also known as System Architecture Evolution, SAE, core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network, RAN, of an EPS has an essentially flat architecture comprising radio base station nodes without reporting to RNCs.

Network Controlled Device-to-Device, D2D, Communication

Network controlled Device-to-Device, D2D, communication facilitates direct communication between wireless devices utilizing the cellular spectrum of the wireless communication network. Due to mobility, varying traffic loads and changes in the radio environment, the wireless communication network may dynamically switch the communication mode between two communicating wireless devices. For this purpose, by means of existing techniques, the wireless communication network may use control signaling to switch the communication mode for two wireless devices in a cell between regular cellular communication, i.e. a cellular mode in which the two wireless devices are communicating via a network node, and direct communication, i.e. a D2D mode in which the two wireless devices are communicating directly with each other. At such communication mode selecting instances, often simply referred to as Mode Selection, MS, the wireless communication network may also configure the characteristics of the cellular or D2D bearer and allocate/reallocate cellular resources used for the cellular or D2D bearers. The purpose of having the MS controlled by the wireless communication network is to ensure high radio resource utilization, manage QoS and at the same time protect the cellular layer from interference caused by D2D communication between wireless devices.

Full Duplex, FD, Communication

Conventionally, wireless communication networks are designed on the premise of Half Duplex, HD, communication that does not allow simultaneous transmission and reception of radio signals on the same frequency channel. Examples on HD transmission and reception schemes comprise, for example, HD Frequency-Division Duplexing, HD FDD, and HD Time-Division Duplexing, HD TDD. These schemes enable separating the transmitted and received signals at a radio transceiver either in frequency or in time or in both. In contrast, Full Duplex, FD, communication enables simultaneous transmission and reception of radio signals. For FD TDD, this may even take place on the same carrier frequency. However, for FD FDD, the transmission and reception of radio signals take place on different carrier frequencies.

It has been generally assumed that FD communication is not practically viable in a wireless network communication because of the large amount of Self-Interference, SI, that is caused by a radio transmitter at the radio receiver. For example, assuming a transmitted signal of 100 mW transmit power and a noise floor at around −90 dBm, the transmit SI must be cancelled by ~90 dB to reduce the SI at the radio receiver to similar level as the set noise floor. This should be considered in view of that commercial isolators normally only may provide ~20 dB of transmit/receive isolation. At present, accomplishing SI cancellation at this order of magnitude is typically not economically viable, if feasible at all.

However, recent developments suggest that this assumption may be questioned in the near future, which raises questions of how to take full advantage of wireless device capable of FD communication in a wireless communication network; and also, how the wireless communication network is to control D2D communication between such FD capable wireless devices.

US 2013/0254277 A1 disclose a wireless communication network which allows an initiation of a D2D communication, using HD or FD communication, based on the range between the D2D pair of wireless devices. However, it does not disclose how a wireless communication network should control the D2D communication in order to take full advantage of the D2D pair of wireless device capable of FD communication in the wireless communication network, such as, for example, how to perform mode selection, MS.

SUMMARY

It is an object of embodiments herein to improve utilization of wireless devices capable of FD communication in a wireless communications network.

According to a first aspect of embodiments herein, the object is achieved by a method performed by a network node for selecting a communication mode in a wireless communications network. The network node obtains information about a first and a second wireless device in the wireless communications network indicating that the first and the second wireless device are capable of communicating using any one of a set of at least three communication modes comprising at least a cellular communication mode, a Device-to-Device, D2D, half-duplex communication mode, and a D2D full-duplex communication mode. Also, the network node selects, from the set of at least three communication modes, one of the communication modes for a communication between the first and second wireless devices when at least one criterion on a capability of the first and second wireless device associated with one of the communication modes is met, and/or at least one criterion on an operational capability of the network node associated with one of the communication modes is met. Then, the network node transmits information about the selected communication mode for the communication between the first and second wireless devices to at least one of the first and second wireless device 121.

According to a second aspect of embodiments herein, the object is achieved by a wireless device for selecting a communication mode in a wireless communications network. The network node comprises a processor configured to obtain information about a first and a second wireless device in the wireless communications network indicating that the first and the second wireless device are capable of communicating using any one of a set of at least three communication modes comprising at least a cellular communication mode, a D2D half-duplex communication mode, and a D2D full-duplex communication mode, and to select, from the set of at least three communication modes, one of the communication modes for a communication between the first and second wireless devices when at least one criterion on a capability of the first and second wireless device associated with one of the communication modes is met, and/or at least one criterion on an operational capability of the network node associated with one of the communication modes is met. The network node also comprises a transmitter configured to transmit information about the selected communication mode for the communication between the first and second wireless devices to at least one of the first and second wireless device 121.

According to a third aspect of embodiments herein, the object is achieved by a method performed by a first wireless device for selecting a communication mode for a communication with a second wireless device in a wireless communications network. The first wireless device obtains information indicating that the second wireless device is capable of communicating using any one of a set of at least three communication modes comprising at least a cellular communication mode, a D2D half-duplex communication mode, and a D2D full-duplex communication mode. Also, the first wireless device selects, from the set of at least three communication modes, one of the communication modes for the communication with the second wireless device when at least one criterion on a capability of the first and second wireless device associated with one of the communication modes is met, and/or at least one criterion on an operational capability of a network node serving the first wireless device in the wireless communications network associated with one of the communication modes is met. Further, the first wireless device performs the communication with the second wireless device using the selected communication mode.

According to a fourth aspect of embodiments herein, the object is achieved by a network node for selecting a communication mode for a communication with a second wireless device in a wireless communications network. The first wireless device comprises a processor configured to obtain information indicating that the second wireless device is capable of communicating using any one of a set of at least three communication modes comprising at least a cellular communication mode, a D2D half-duplex communication mode, and a D2D full-duplex communication mode. The processor is also configured to select, from the set of at least three communication modes, one of the communication modes for the communication with the second wireless device when at least one criterion on a capability of the first and second wireless device associated with one of the communication modes is met, and/or at least one criterion on an operational capability of a network node serving the first wireless device in the wireless communications network associated with one of the communication modes is met. Furthermore, the processor is configured to perform the communication with the second wireless device using the selected communication mode.

According to a fifth aspect of embodiments herein, the object is achieved by a computer program, comprising instructions which, when executed on at least one processor, cause the at least one processor to carry out the method described above. According to a sixth aspect of embodiments herein, the object is achieved by a carrier containing the computer program described above, wherein the carrier is one of an electronic signal, optical signal, radio signal, or computer readable storage medium.

By selecting communication mode, i.e. performing Mode Selection, MS, according as described above, the wireless communications network is enabled to take full advantage of the FD capability of wireless devices and thereby achieving higher resource utilization as compared to traditional MS techniques. Hence, the utilization of wireless devices capable of FD communication in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

Figure 1:
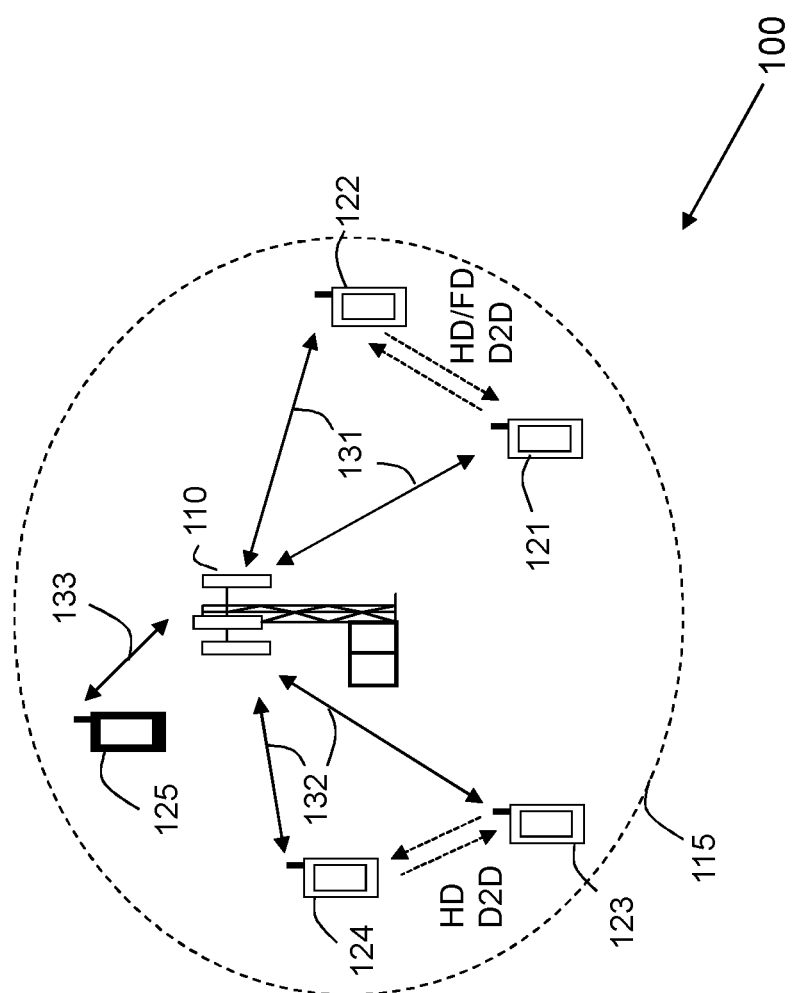
FIG. 1 is a schematic block diagram illustrating embodiments of network nodes in a radio communications network.

The figures are schematic and simplified for clarity, and they merely show details which are essential to the understanding of the embodiments presented herein, while other details have been left out. Throughout, the same reference numerals are used for identical or corresponding parts or steps.

FIG. 1 shows an example of a wireless communications network 100 in which embodiments herein may be implemented. Although illustrated in FIG. 1 as an LTE network, the wireless communications network 100 may be any radio communication system, such as, LTE-Advanced, Wideband Code-Division Multiple Access (WCDMA), Global System for Mobile communications/Enhanced Data rate for GSM Evolution (GSM/EDGE), Worldwide Interoperability for Microwave Access (WMax), Ultra Mobile Broadband (UMB) or GSM network, or other cellular network or system. The wireless communications system 100 comprises the network node 110.

The network node 110 may a radio network node, such as, e.g. eNB, eNodeB, or a Home Node B, a Home eNode B, femto Base Station (BS), pico BS, a radio access point (AP) or any other network unit capable to serve wireless devices in the wireless communications system 100. The network node 110 may also be e.g. a radio base station, a base station controller, a relay node, a repeater, an access point, a radio access point, a Remote Radio Unit (RRU) or a Remote Radio Head (RRH). Furthermore, the network node 110 comprises one or more antennas for wireless radio communication with wireless devices located within their coverage range; that is, the network node 110 may use one or more of its antennas to provide radio coverage within a cell 115.

A cell may be seen as a geographical area where radio coverage is provided by radio base station equipment at a base station site or at remote locations by Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying each cell uniquely in the whole radio communication network 100 may also be broadcasted in the cell. The network node 110 communicates over the air or radio interface operating on radio frequencies with the wireless devices within range of the network node 110.

A first and a second wireless device 121, 122 are located within the cell 115. The first and second wireless devices 121, 122 are configured to communicate within the radio communications network 100 via the network node 110 over a radio link 131 when present in the cell 101 served by the network node 110, i.e. perform conventional cellular communication. Further, the first and second wireless devices 121, 122 are wireless device capable of performing both half-duplex, HD, D2D communication and/or full duplex, FD, D2D communication.

Also, a third and a fourth wireless device 123, 124 are located within the cell 115. The third and fourth wireless devices 123, 124 are configured to communicate within the radio communications network 100 via the network node 110 over a radio link 132 when present in the cell 101 served by the network node 110, i.e. perform conventional cellular communication. Further, the third and fourth wireless devices 123, 124 are wireless device capable of performing half-duplex, HD, D2D communication.

Also, a fifth wireless device 125 is located within the cell 115. The fifth wireless device 125 is configured to communicate within the radio communications network 100 via the network node 110 over a radio link 133 when present in the cell 101 served by the network node 110, i.e. perform conventional cellular communication. The fifth wireless device 125 is not capable of performing D2D communication.

The first, second, third, fourth and fifth wireless devices 121-125 may e.g. be any kind of wireless device such as a mobile phone, a cellular phone, a Personal Digital Assistant (PDA), a smart phone, a tablet, a sensor equipped with a wireless device, Laptop-Mounted Equipment (LME) (e.g. USB), Laptop-Embedded Equipment (LEE), Machine-Type-Communication (MTC) device, a wireless device with D2D capability, Customer Premises Equipment (CPE), USB dongle, etc.

Furthermore, although embodiments below are described with reference to the scenario of FIG. 1, this scenario should not be construed as limiting to the embodiments herein, but merely as an example made for illustrative purposes.

As part of developing the embodiments herein, it has been noticed that in the scenario of FIG. 1, i.e. where HD/FD D2D communication capable wireless devices, HD D2D communication capable wireless devices and non-D2D communication capable wireless devices are present in the proximity of each other, there is an issue of managing the D2D bearers in this mixed environment such that key performance measures on spectrum/energy efficiency in the wireless communications network are improved and the cellular layer is protected from D2D interference.

It has further been noticed that existing solutions do not take into account the fact that some wireless devices in the wireless communications network are capable of FD D2D communication. This means that existing solutions merely provide Mode Selection, MS, between cellular communication and HD D2D communication for wireless devices in the wireless communications network. Hence, there is a need to improve the utilization of wireless devices capable of FD communication in a wireless communications network.

In accordance with embodiments described herein, this issue is addressed by a new MS technique which selects between the at least three communication modes, i.e. a cellular mode, a D2D HD mode and D2D FD mode based on whether one or more criterion is met, such as, e.g. path loss, system load, power consumption of the wireless devices, available cellular spectrum, etc. This enables a periodic communication mode selection decision to be made for or by non-capable, HD capable and FD capable D2D wireless devices such that FD D2D capable wireless devices may fully utilize their FD communication mode capabilities depending on their relative geometry, location, power consumption, capability, etc., and also depending on the current network load situation. This ensures an improved selection of communication modes in terms of required cellular resources for the D2D bearer and to protect the cellular layer from D2D interference, while also taking into account the preferences and capabilities of the wireless devices for local communication.

It should be noted that the embodiments described herein demonstrates how the MS may be performed by a network node or autonomously by a wireless device, e.g. when given permission by the network node. Optionally, the embodiments described herein also demonstrate that a wireless device may recommend one or more communication modes to a network node, which a network node may take into consideration when selecting the communication mode in its MS for the wireless devices.

Example of embodiments of a method performed by a network node 110 for selecting a communication mode in a wireless communications network 100, will now be described with reference to the flowchart depicted in FIG. 2.

Figure 2:
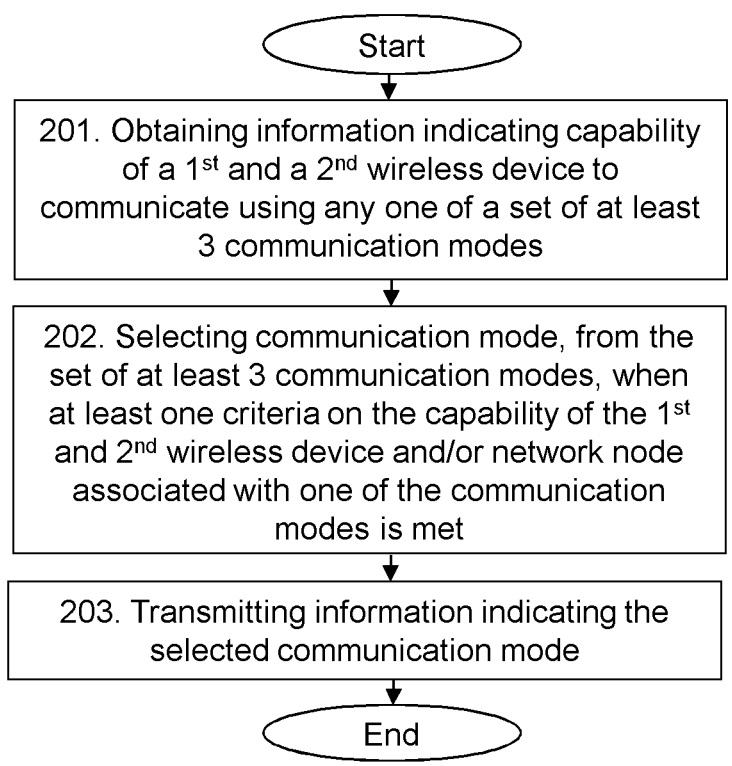
FIG. 2 is a flowchart depicting embodiments of a method in a network node.

FIG. 2 illustrates an example of actions or operations which may be taken by the network node 110. However, it should also be noted that these actions or operations may also be performed by a centralized network node in the radio communications network 100, e.g. a core network node, such as, a radio network controller, a Radio Resource Management, RRM, server, an Application Server, AS, node, a Policy Control Function, PCRF, node, a Mobility Management Entity, MME, node, an Operations Support System, OSS, node or the like. The centralized network node may also be e.g. an eNB controlling distributed Remote Radio Units, RRUs, via e.g. a Common Public Radio Interface, CPRI, or an eNB controlling radio heads over an active Distributed Antenna System, DAS, network. The method comprises the following actions.

Action 201

The network node 110 first obtains information about the first and the second wireless device 121, 122 in the wireless communications network 100 indicating that the first and the second wireless device 121, 122 are capable of communicating using any one of a set of at least three communication modes comprising at least a cellular communication mode, a D2D HD communication mode, and a D2D FD communication mode.

In some embodiments, the network node 110 may obtain the information by receiving it from the first and/or the second wireless device 121, 122. For example, the network node 110 may receive a recommended communication mode from one of the first and the second wireless device 121, 122. In this case, the network node 110 may select a communication mode which is determined by the network node 110 or the communication mode which is recommended by one of the first and second wireless device 121, 122 in Action 202. According to one example, if the communication mode obtained from the first and/or the second wireless device 121, 122 do not match a communication mode determined by the network node 110, the network node 110 may select the communication mode determined by the network node 110.

Alternatively, the network node 110 may obtain the information by receiving it from another network node in the wireless communications network 100 (not shown), or by retrieving it from historical data or stored information in the network node 110.

Action 202

Secondly, the network node 110 selects from the set of at least three communication modes, one of the communication modes for a communication between the first and second wireless devices 121, 122 when at least one criterion on a capability of the first and second wireless device 121 associated with one of the communication modes is met, and/or at least one criterion on an operational capability of the network node 110 associated with one of the communication modes is met. This basically means that the network control performed by the network node 110 of D2D related measurement reporting and D2D bearer establishment are extended such that the network node 110 may select a communication mode out of the following communication modes: a cellular mode, a D2D HD mode, and a D2D FD mode. It should be noted that this set of communication modes may comprise more than the above three possible communication modes depending on, for example, the duplexing mode used by the wireless communications network for traditional cellular communication, available carrier frequencies, the current load situation and resource utilization on cellular UL and DL resources, device capabilities, etc., as further described below.

A first example of MS performed by the network node 110 comprises switching between three communication modes: a cellular mode, a D2D HD-TDD mode using carrier frequency f1, and a D2D FD mode using carrier frequency f2. Here, f1=f2 or f1≠f2. A second example of MS performed by the network node 110 comprises switching between three communication modes: a cellular mode, a D2D HD-FDD mode using frequency carriers f1 and f2, and a D2D FD mode using frequency carrier f3. Here, f2≠f1 and f3=f2 (or f3≠f2 or f3=f1 or f3≠f1).

A third example of MS performed by the network node 110 comprises switching between four communication modes: a cellular mode, a D2D HD-TDD mode using frequency carrier f1, a D2D HD-FDD mode using frequency carriers f2 and f3, and a D2D FD mode using frequency carrier f4. Here, at least f2≠f3.

A fourth example of MS performed by the network node 110 comprises switching between five communication modes: a cellular mode, a D2D HD-TDD using UL frequency carrier f1 which may be used for UL cellular communication, a D2D HD-TDD using DL frequency carrier f2 which may be used for DL cellular communication, a D2D FD mode using UL frequency carrier f3 which may be used for UL cellular communication, or a D2D FD mode using DL frequency carrier f4 which may be used for DL cellular communication.

According to some embodiments, the network node 110 may select the D2D FD communication mode as the communication mode for the communication between the first and second wireless devices 121, 122 when at least one criterion on the capability of the first and second wireless device 121, 122 associated with the D2D FD communication mode is met. This allows the network node 110 to determine when to use the D2D FD communication mode based on the available capabilities of the first and second wireless device 121, 122. In some embodiments, a capability of the first and second wireless device 121, 122 associated with the D2D FD communication mode may be a self-interference mitigation capability of the first and second wireless device 121, 122. In this case, one of the at least one criterion is met when both the first and second wireless device 121, 122 have a self-interference mitigation capability which enables a D2D FD communication mode. This further allows the network node 110 to determine when to use the D2D FD communication mode based on a specific capability of the first and second wireless device 121, 122.

In some embodiments, a capability of the first and second wireless device 121, 122 associated with the D2D FD communication mode may be a path loss or signal strength value for a D2D communication between the first and second wireless device 121, 122. In this case, one of the at least one criterion is met when the path loss or signal strength value is above a determined threshold value. This means, for example, that when the path loss or signal strength, e.g. a reference signal received power (RSRP) value or a geometry factor, between the first and second wireless device 121, 122 is too large, i.e. above a predetermined or predefined threshold, D2D communication may not be a viable alternative and the network node 100 may select cellular mode instead. In contrast, the when the path loss or signal strength measurements indicate a value between two predetermined or predefined thresholds (see e.g. "medium" in Table 1 below), the network node 100 may select one of the D2D communication modes. This may e.g. be performed when the first and second wireless device 121, 122 is not too close to a network node 110, i.e. when the path loss or signal strength value towards the network node 110 is above a threshold. In this case, the network node 110 may further select between D2D mode with dedicated (non-overlapping with resources used for cellular communication) or overlapping resources (i.e. overlapping with resources used for cellular communication) causing intra-cell interference between D2D and cellular links in the wireless communications network 100. Furthermore, when the path loss or signal strength value for a D2D communication between the first and second wireless device 121, 122 is less than a predefined threshold, e.g. TH2 in Table 1, the network node 100 may select the D2D FD mode for the D2D communication between the first and second wireless device 121, 122. Thus, in some embodiments, a capability of the first and second wireless device 121, 122 associated with the D2D FD communication mode may be a path loss or signal strength value towards the network node 110. In this case, one of the at least one criterion is met when the path loss or signal strength value is above a determined threshold value.

In some embodiments, a capability of the first and second wireless device 121, 122 associated with the D2D FD communication mode may be a value indicative of the distance between the first and second wireless device 121, 122. In this case, one of the at least one criterion is met when the path loss or signal strength value is above a determined threshold value. The information about the location of a wireless device with respect to network node 110 and/or with respect other D2D capable wireless devices may also be used by the network node 110 for determining the appropriate mode for a D2D capable wireless device. The location of a wireless device may be particularly used to handle situations in which the wireless devices communicating using D2D communication move with high velocity such that their locations with respect to each other changes significantly over time. The location of a wireless device may be determined by the wireless device and/or by the network node 100, using e.g. a positioning server or node, by using available positioning methods, such as, e.g. GNSS, A-GNSS, enhanced cell-ID, OTDOA, etc. For example, a first and second wireless device 121, 122 which are close to each other, e.g. 10-20 meters, may be selected and configured to operate using a D2D HD mode or a D2D FD mode. According to another example, when the first wireless device 121 is close to the serving network node 110, but far from the second wireless device 122 with which it wants to communicate, then the network node 110 may select and configure the first wireless device 121 for cellular mode.

In some embodiments, a capability of the first and second wireless device 121, 122 associated with the D2D FD communication mode may be one or more values indicative of the remaining battery power level of the first and/or second wireless device 121, 122. In this case, one of the at least one criterion is met when the one or more values indicative of the remaining battery power level is above a determined threshold value. This means, for example, that when the battery life or power of the first and/or second wireless device 121, 122 is low, e.g. below a determined threshold (such as, e.g. 20% or less of a maximum level), the network node 110 may select either D2D HD or D2D FD modes provided that the D2D pairs are also close to each either. This is because HD and especially FD modes are used when the first and second wireless device 121, 122 are close to each other. In this case, the first and/or second wireless device 121, 122 may reduce its output power. The network node 110 may also select the communication mode that leads to lower power consumption in case the battery life or power of the first and/or second wireless device 121, 122 is below a determined threshold. For example, in cases when one of the first and second wireless device 121, 122 is very close to the network node 110 but far from the other wireless device, then the network node 110 may even select cellular mode.

In some embodiments, a capability of the first and second wireless device 121, 122 associated with the D2D FD communication mode may be a communication mode which is recommended by at least the first wireless device 121 for the communication between the first and second wireless devices 121, 122. In this case, one of the at least one criterion is met when the recommended communication mode is the D2D FD communication mode. This may, for example, be performed when the network node 110 obtained information in Action 201 by receiving it from the first and/or the second wireless device 121, 122, where this information comprise a communication mode which is recommended by at least the first wireless device 121.

According to some embodiments, the network node 110 may also select the D2D FD communication mode as the communication mode for the communication between the first and second wireless devices 121, 122 when at least one criterion on the operational capability of the network node 110 associated with the D2D FD communication mode is met. This allows the network node 110 to determine when to use the D2D FD communication mode based on the available capabilities of the network node 110.

In some embodiments, an operational capability of the network node 110 associated with the D2D FD communication mode is the number of carrier frequencies available for D2D communication. In this case, one of the at least one criterion is met when the number of carrier frequencies available for D2D communication is above a determined threshold value. If the available spectrum is limited, for example, when only one carrier frequency is available for D2D communication, then the network node 110 may select a cellular mode or a D2D HD-TDD mode. However, when sufficient cellular spectrum is available, for example, when there are two or more carrier frequencies available for D2D communication, then network node 110 may use D2D HD-FDD mode for some D2D capable wireless devices and/or D2D FD for some D2D capable wireless devices This is because for a D2D FD communication mode typically separate carrier frequencies would be needed.

Furthermore, at high load in the wireless communications network 100, for example, during high amount of cellular load on the network node 110, such as, e.g. high amounts of transmission power usage of the network node 110, high amounts of channel usage, etc., the network node 110 may prefer to select either a D2D HD-TDD mode, a D2D HD-FDD mode or D2D FD mode, but avoid selecting a cellular mode for the communication between the first and second wireless device 121, 122. Also, when load is high in the downlink, for example, when downlink channel usage is above a determined threshold, but low in the uplink, for example, when uplink channel usage is above a determined threshold, the network node 110 may select D2D HD-TDD on the uplink cellular carrier frequency. Further, when there are enough resources available, the network node 110 may select separate resources to be assigned for the D2D bearers between the first and second wireless device 121, 122 to avoid intra-cell interference, particularly at high loads, such as, e.g. higher experienced interference in uplink and/or downlink. For example, at high load, a D2D communication with low power in a D2D FD communication mode, the network node 110 may reuse cellular resources or operate on separate carrier frequencies if available.

In some embodiments, an operational capability of the network node 110 associated with the D2D FD communication mode is the number of D2D communications handled by network node 110. In this case, one of the at least one criterion is met when the number of D2D communications handled by network node 110 is above a determined threshold value. This means, for example, when there is a large number of D2D capable wireless devices in a cell, e.g. above a determined threshold, such as, e.g. more than 80 D2D capable wireless devices, then the network node 110 may use either a D2D HD-FDD or a D2D FD mode for several of the D2D capable wireless devices, e.g. at least 70% of the D2D capable wireless devices. This may be performed in order to reduce load on the cellular resources.

TABLE 1

| D2D Path Loss | Device to BS Path Loss | Traffic Load | Delay Requirement | Communication Mode |
|---|---|---|---|---|
| >TH1 (large) | X | X | X | Cellular Mode |
| TH2 < PL < TH1 (medium) | >TH3 | Low | Tight/X | Cellular or HD D2D Mode with dedicated resources |
| TH2 < PL < TH1 (medium) | >TH3 | High | Tight/X | Cellular or HD D2D Mode possibly with overlapping resources (intracell resource reuse) |
| <TH2 | <TH3 | Low | Tight/X | Cellular, HD D2D or FD D2D with dedicated resources |
| <TH2 | <TH3 | High | Tight/X | Cellular, HD D2D or FD D2D with overlapping resources (intracell resource reuse) |

Table 1 above shows an example of a MS table that the network node 110 may use to make MS and resource allocation decisions, i.e. select the communication mode. For example, the signaling messages described for the different capabilities of the network node 110 and the first and second wireless device 121, 122 may be used to provide the network node 110 with the necessary input data to make proper MS and continuously re-evaluate the most suitable communication mode as the first and second wireless device 121, 122 move around and/or change their service requirements and/or the radio environment changes.

According to some embodiments, the network node 110 may here also determine to use overlapping or non-overlapping cellular transmission resources for the communication between the first and second wireless device 121, 122 in the D2D FD communication mode based on the amount of traffic and/or system load in the network node 110.

Action 203

Following the selection in Action 201, the network node 110 transmits information about the selected communication mode for the communication between the first and second wireless devices 121, 122 to at least one of the first and second wireless device 121.

Figure 3:
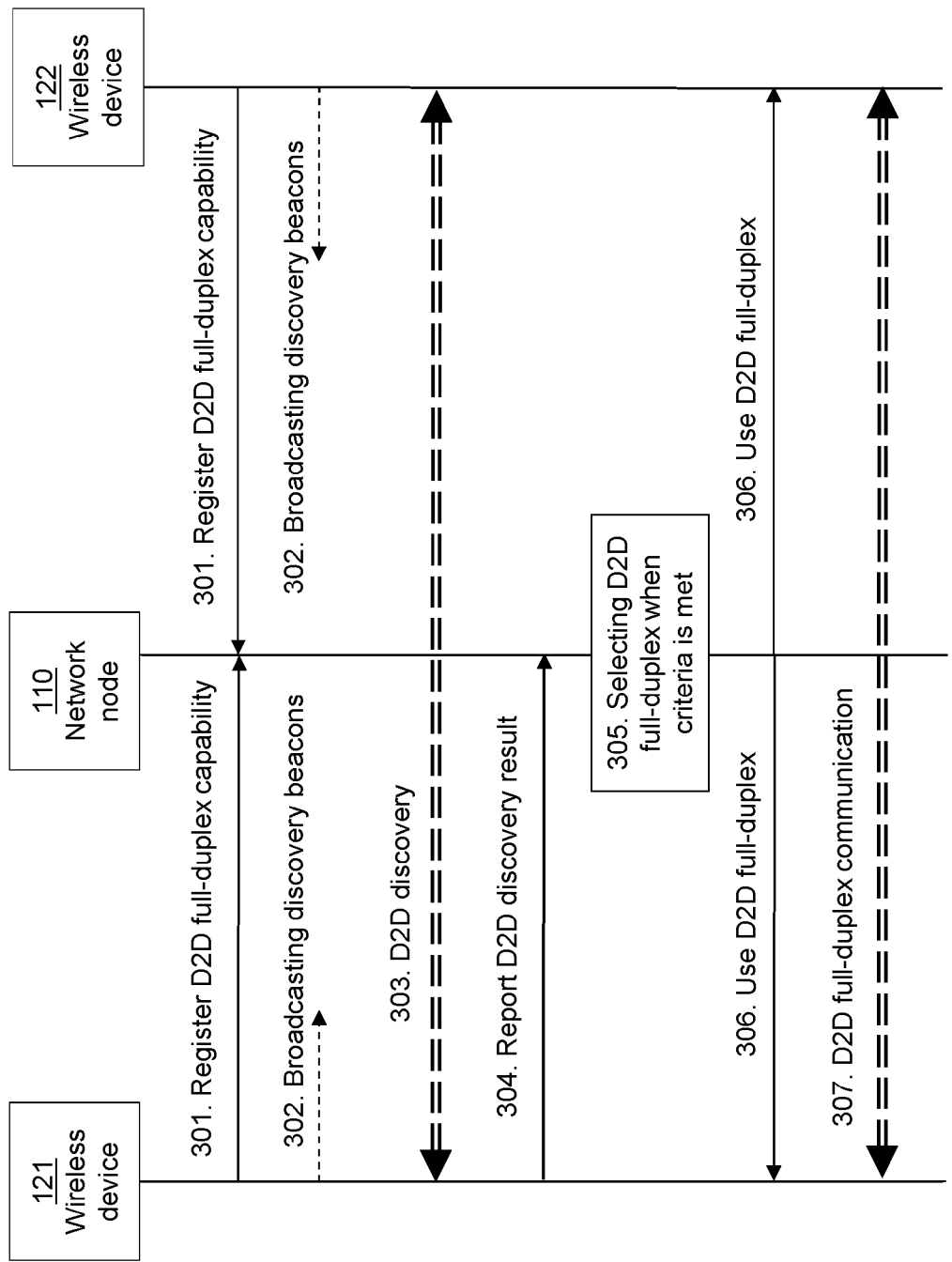
FIG. 3 is a signalling scheme depicting embodiments of a method in a wireless device.

FIG. 3 shows a signalling diagram describing embodiments of the above described method in terms of signaling messages.

Action 301

Prior to the mode selection algorithm executed by the network node 110, the first and second wireless device 121, 122 may register their duplexing capabilities, which may include parameters, such as, D2D FD specific parameters, e.g. self-interference suppressing capability, maximum transmit power in D2D FD mode, and supported Modulation and Coding Schemes, MCS, in D2D FD mode.

Action 302

After the registration in Action 301, the first and second wireless device 121, 122 may use D2D neighbour discovery procedures to discover other wireless devices in their neighbourhood. To enable a-priori discovery, the existing techniques for broadcasting discovery beacon signals may be extended to comprise information or indication about the D2D FD capability of the beaconing device. Alternatively, the beacon signal may, as conventional, comprise information about the device identity, provided or desired services, etc., according to existing techniques.

Action 303

When the first and second wireless device 121, 122 detect and successfully decode each other's beacons in Action 303, the first and second wireless device 121, 122 may exchange other pieces of information by including such information in their continued broadcasting. For example, when the second wireless device 121 detects the beacon of the first wireless device 121, the second wireless device 121 may discover that the first wireless device 121 is in a list of known wireless devices with which the second wireless device 121 has detected and/or communicated with before, e.g. a so-called buddy list, or that the first wireless device 121 offers a service that the second wireless device 121 wishes to use. As a result, the second wireless device 121 may modify its beacon signal to provide specific feedback (indication) on its own identity, service interest and also its capabilities, including duplexing (e.g. information regarding D2D FD communication mode capability) or multiple antennas, modulation and coding scheme (MCS) or Quality of Service (QoS) capabilities. The first and second wireless device 121, 122 may also use the detected beacons signals to form estimates of their path loss and channel conditions.

Action 304

After or in parallel with the D2D discovery procedure, as indicated in FIG. 3, at least one of the first and second wireless devices 121, 122 reports the results of the discovery procedure to the network node 110, e.g. its serving base station. This may be performed after establishing a Radio Resource Control, RRC, connection using existing techniques. This discovery report may include information about the peer wireless device's identity, capabilities and information about large scale fading (i.e. path loss) measurements. For example, first wireless device 121 may indicate that the second wireless device 121 is in its close proximity and that the second wireless device 121 offers a service, such as, e.g. printing or file server service, which the first wireless device 121 wants to use. This is described in Action 201 in reference to FIG. 2.

Action 305

The network node 110 may then use this signalled information as input to its initial mode selection (MS) and resource allocation (RA) decision. The purpose of this initial MS and RA decision is to enable the first and second wireless device 121, 122 to establish a D2D bearer if the conditions for a direct D2D communication mode are favourable, but also to protect the cellular layer from excessive D2D interference and ensure proper QoS for the first and second wireless device 121, 122 while maintaining high radio resource utilization. This is described in Action 202 in reference to FIG. 2.

Action 306

This MS and RA decision is then communicated to the first and second wireless device 121, 122 using, for example, RRC signaling. This is described in Action 203 in reference to FIG. 2.

Action 307

Once the selected mode and allowed radio resources are determined, the D2D bearer is established and the first and second wireless device 121, 122 may communicate in the selected D2D mode. Examples of radio resources are transmit power, maximum allowed or transmit power, physical channels, radio or frequency channels etc. Examples of physical channels are time-frequency resources, such as, physical resource blocks, PRBs, resource elements, REs, time slots, subframes, symbols, frames, etc. Examples of radio channels are sub-carriers, carrier frequency, or set of carrier frequencies over which radio resources, such as, physical channels, are transmitted with certain transmit power level.

While in the selected D2D mode, the first and second wireless device 121, 122 may periodically broadcast reference signals that, in general, are different from the D2D discovery beacons in terms of broadcast information, employed MCS, transmit power levels, periodicity and used time-frequency resources. The purpose of the reference signals is to enable the peer device to measure and report on the D2D radio measurement, such as, for example, path loss or geometry values (e.g. large scale fading), similarly to the purpose of cellular reference signals transmitted by the network node 110.

Figure 4:
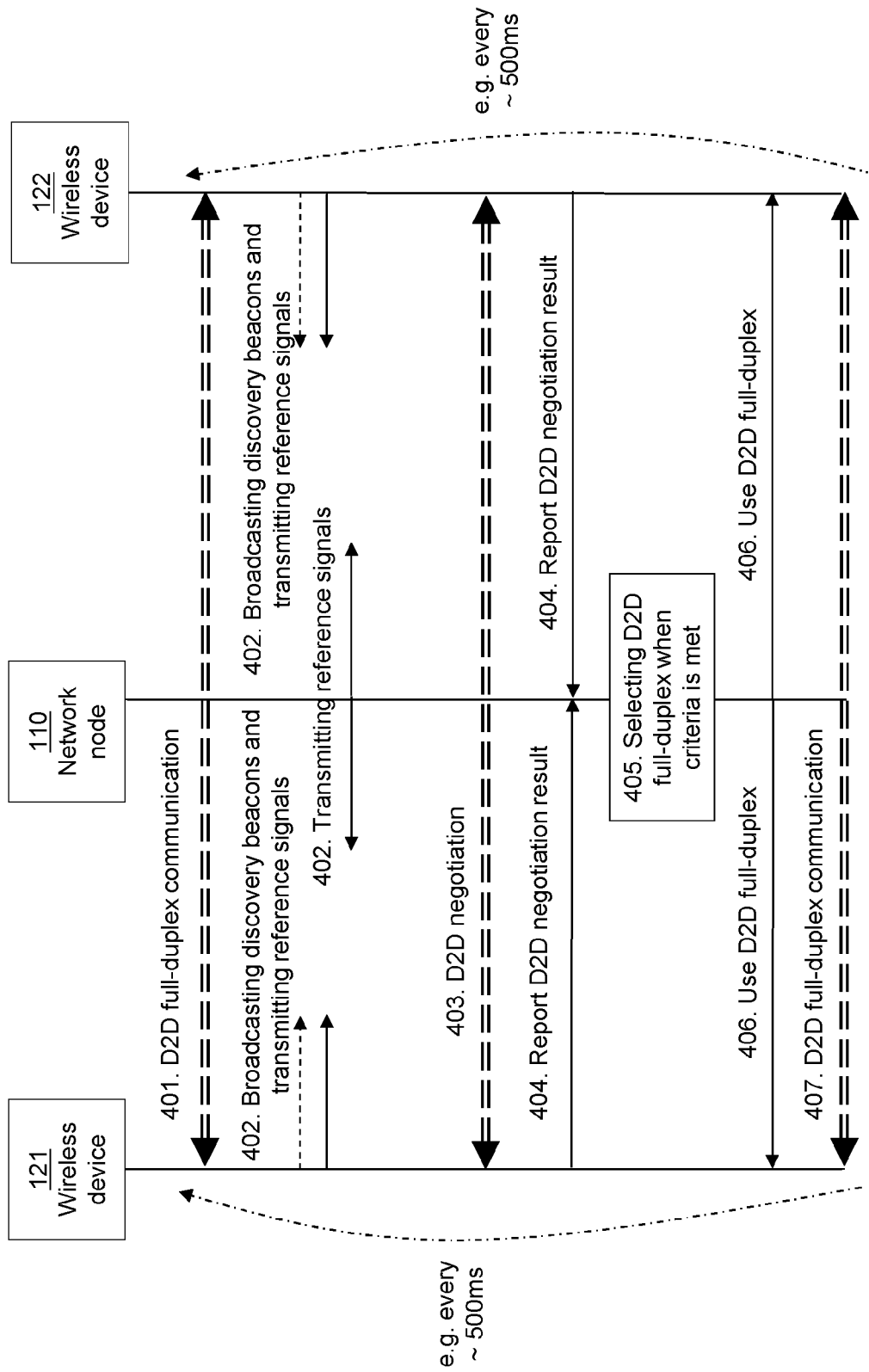
FIG. 4 is a signalling scheme depicting embodiments of methods in a network node and a wireless device, FIG. 5 a flowchart depicting embodiments of a method in a wireless device.

The first and second wireless device 121, 122 may thus continuously measure on both cellular and D2D specific reference signals, while the network node 110 may makes a MS decision on a coarse time scale, such as, about every 500-1000 ms, taking into account capability of the first and second wireless device 121, 122 in terms of supported modes and based on one or more criterion. This is further shown by Actions 401-408 in FIG. 4 corresponding to the Actions 301-307 in FIG. 3.

In addition, while in the selected D2D mode, the first and second wireless device 121, 122 may periodically exchange service related information, such as, e.g. experienced QoS information, or other information that may affect the best communication mode between the first and second wireless device 121, 122. For example, if the first wireless device 121 experiences degrading QoS, it may indicate to the second wireless device 122 that its preferred communication mode is a D2D HD mode rather than a D2D FD mode.

Figure 5:
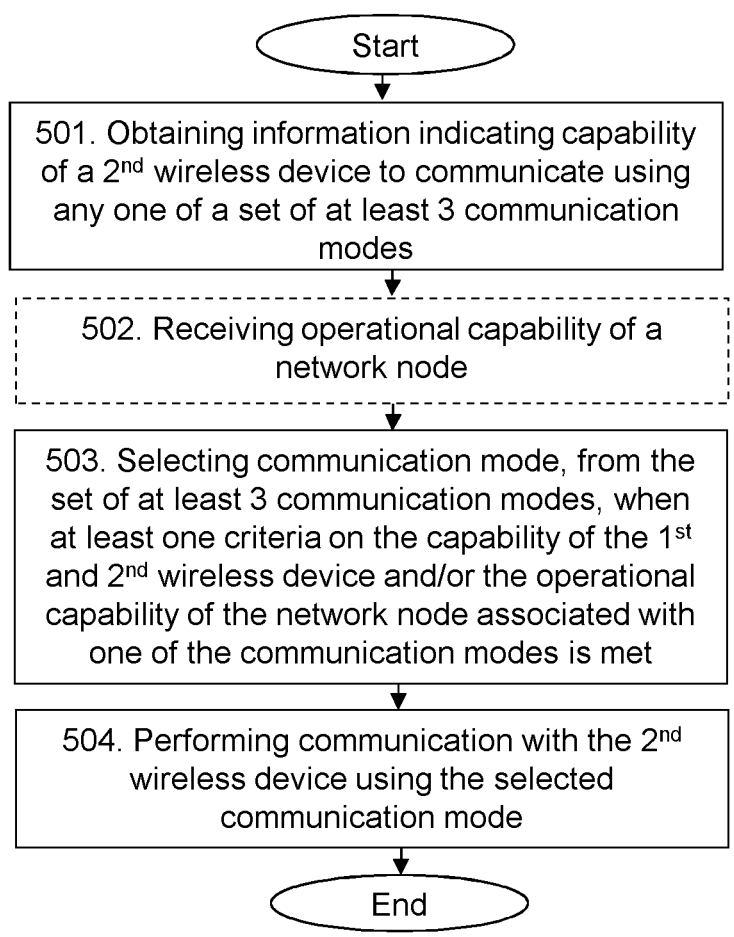

Example of embodiments of a method performed by a first wireless device 121 for selecting a communication mode for a communication with a second wireless device 122 in a wireless communications network 100, will now be described with reference to the flowchart depicted in FIG. 5. FIG. 5 is an illustrated example of actions or operations which may be taken by the first wireless device 121. The method comprises the following actions.

Action 501

The first wireless device 121 obtains information indicating that the second wireless device 122 is capable of communicating using any one of a set of at least three communication modes comprising at least a cellular communication mode, a D2D HD communication mode, and a D2D FD communication mode.

In some embodiments, this may be performed by receiving the information from the second wireless device 122. Alternatively, this may be performed by receiving the information from a network node 110, or by retrieving the information stored in the memory of the first wireless device 121.

Action 502

After receiving the information in Action 501, the first wireless device 121 selects, from the set of at least three communication modes, one of the communication modes for the communication with the second wireless device 122 when at least one criterion on a capability of the first and second wireless device 121 associated with one of the communication modes is met, and/or at least one criterion on an operational capability of a network node 110 serving the first wireless device 121 in the wireless communications network 100 associated with one of the communication modes is met. This basically means that the control of D2D related measurement reporting and D2D bearer establishment are extended such that the first wireless device 121 may select a communication mode out of the following communication modes: a cellular mode, a D2D HD mode, and a D2D FD mode. It should be noted that this set of communication modes may comprise more than the above three possible communication modes depending on, for example, the duplexing mode used by the wireless communications network for traditional cellular communication, available carrier frequencies, the current load situation and resource utilization on cellular UL and DL resources, device capabilities, etc., as described above in reference to the embodiments of the network node 110 in Action 202. This further allows the first wireless device 121 to determine when to use the D2D FD communication mode based on the available capabilities of the first and second wireless device 121, 122 and/or the available capabilities of the network node 110.

According to some embodiments, the first wireless device 121 may select the D2D FD communication mode as the communication mode for the communication between the first and second wireless devices 121, 122 when at least one criterion on the capability of the first and second wireless device 121 associated with the D2D FD communication mode is met. This further allows the first wireless device 121 to determine when to use the D2D FD communication mode based on a specific capability of the first and second wireless device 121, 122.

In some embodiments, a capability of the first and second wireless device (121) associated with the D2D FD communication mode may be a self-interference mitigation capability of the first and second wireless device 121, 122. In this case, one of the at least one criterion is met when both the first and second wireless device 121, 122 have a self-interference mitigation capability which enables a D2D FD communication mode. In some embodiments, a capability of the first and second wireless device 121 associated with the D2D FD communication mode may be a path loss or signal strength value for a D2D communication between the first and second wireless device 121, 122. In this case, one of the at least one criterion is met when the path loss or signal strength value is above a determined threshold value. In some embodiments, a capability of the first and second wireless device 121 associated with the D2D FD communication mode may be a path loss or signal strength value towards the network node 110. In this case, one of the at least one criterion is met when the path loss or signal strength value is above a determined threshold value. In some embodiments, a capability of the first and second wireless device 121 associated with the D2D FD communication mode may be a value indicative of the distance between the first and second wireless device 121, 122. In this case, one of the at least one criterion is met when the path loss or signal strength value is above a determined threshold value. In some embodiments, a capability of the first and second wireless device 121 associated with the D2D FD communication mode may be one or more values indicative of the remaining battery power level of the first and/or second wireless device 121, 122. In this case, one of the at least one criterion is met when the one or more values indicative of the remaining battery power level is above a determined threshold value.

According to some embodiments, the first wireless device 121 may also receive one or more operational capabilities from a network node 110 serving at least the first wireless device 121 in the wireless communications network 100. In this case, the wireless device 121 may select the D2D FD communication mode as the communication mode for the communication between the first and second wireless devices 121, 122 when at least one criterion on the operational capability of the network node 110 associated with the D2D FD communication mode is met. In some embodiments, an operational capability of the network node 110 associated with the D2D FD communication mode may be the number of carrier frequencies available for D2D communication. In this case, one of the at least one criterion is met when the number of carrier frequencies available for D2D communication is above a determined threshold value. In some embodiments, an operational capability of the network node 110 associated with the D2D FD communication mode may be the number of D2D communications handled by network node 110. In this case, one of the at least one criterion is met when the number of D2D communications handled by network node 110 is above a determined threshold value.

It should be noted that the same examples, advantages and considerations as described above in reference to the embodiments of the network node 110 in Action 202 for the corresponding capabilities also applies for the selection of the communication mode when performed by the first wireless device 121.

According to some embodiments, the first wireless device 121 may also transmit to the network node 110 serving at least the first wireless device 121 in the wireless communications network 100, information indicating that the first and the second wireless device 121, 122 are capable of communicating using any one of a set of at least three communication modes comprising at least a cellular communication mode, a D2D HD communication mode, and a D2D FD communication mode. Thus, the first wireless device 121 may simply inform the network node 110 about the capabilities of the first and second wireless device 121, 122.

According to some embodiments, the first wireless device 121 may further transmit, to the network node 110 serving at least the first wireless device 121 in the wireless communications network 100, information indicating that one of the communication modes in the set of at least three communication modes has been selected. This may be a recommended communication mode that has been selected by the first wireless device 121 for the communication with the second wireless device 122; that is, for example, based on periodic measurements and mode negotiation, the first and second wireless device 121, 122 may agree on a mutually preferred communication mode and, optionally, some associated parameters, e.g. used transmit power level, target SINR level, etc. The first wireless device 121 and/or the second wireless device 122 may then report this agreed communication mode as a recommendation to the network node 110. This may be referred to as wireless device assisted mode selection. According to some embodiments, the first and second wireless device 121, 122 may choose to send recommendations only when the recommended communication mode is different from the currently ongoing communication mode. Then, the first wireless device 121 may receive, from the network node 110, information indicating that one of the communication modes in the set of at least three communication modes has been selected for the communication with the second wireless device 122. After the reception, the first wireless device 121 may determine a communication mode for the communication with the second wireless device 122 based on the communication mode selected by the first wireless device 121 and the information about the selected communication mode received from the network node 110.

Here, in some embodiments, the first wireless device 121 may further receive, from the network node 110 serving the first wireless device 121 in the wireless communication network 100, information indicating that the first wireless device 121 is allowed to determine the communication mode for the communication with the second wireless device 122. In these embodiments, the network node 110 may delegate the mode selection decision to the first wireless device 121. The network node 110 may further delegate this task to the first wireless device 121 for certain time period or duration and under certain conditions, such as, e.g. when the battery power of the first wireless device 121 is below a threshold. According to some embodiments, the first wireless device 121 may only be allowed to execute MS if explicitly allowed or configured by the network node 110. In this case, the first wireless device 121 may use one or more criterion above to select an appropriate mode. The network node 110 may also provide the first wireless device 121 with parameters and/or thresholds associated with the criterion, such as, e.g. current system load information.

Furthermore, in some embodiments, the first wireless device 121 may be allowed to autonomously select one of the communication modes based on the implementation in the first wireless device 121 or one of the criterion as described above. The first wireless device 121 may thus be allowed by the network node 110 to operate using the autonomously selected communication mode.

According to another example, the first wireless device 121 may use any pre-defined or configured set of criterion to select any of the pre-defined modes or configured set of communication modes. For example, the network node 110 may also pre-configure the first wireless device 121 with two or more communication modes, wherein at least one is the D2D FD mode, out of which the first wireless device 121 is allowed to autonomously select the communication mode in the MS and use it for the D2D operation with the second wireless device 122.

According to some embodiments, the first wireless device 121 may further transmit, to a network node 110 serving at least the first wireless device 121 in the wireless communications network 100, information indicating that the D2D FD communication mode has been selected by the first wireless device 121. This may be a recommended communication mode that has been selected by the first wireless device 121 for the communication with the second wireless device 122. The first wireless device 121 may also determine and recommend more than one mode, such as, e.g. two different communication modes, e.g. D2D FD and D2D HD-FDD. The first wireless device may also indicate a recommendation level for each communication mode in case it recommends two or more communication modes. In response, the first wireless device 121 may receive, from the network node 110, information indicating the D2D FD communication mode has been selected by the network node 110 for the communication with the second wireless device 122. Thus, here, it may eventually be the network node 110 that actually periodically determines the communication mode for the first and second wireless device 121, 122 based on e.g. the signalled measurement data from the first and second wireless device 121, 122, recommended, or preferred, communication modes by the first and second wireless device 121, 122, and/or associated parameters.

Action 503

In the selection, the wireless device 121 performs the communication with the second wireless device 122 using the selected communication mode.

Figure 6:
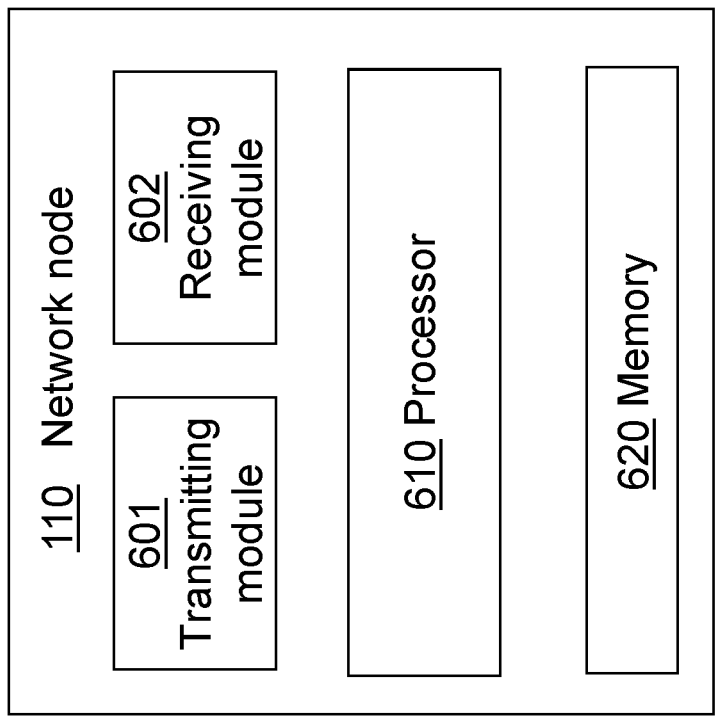
FIG. 6 is a schematic block diagram depicting embodiments of a network node.

To perform the method actions in the network node 110 for selecting a communication mode in a wireless communications network 100, the network node 110 may comprise the following arrangement depicted in FIG. 6.

FIG. 6 shows a schematic block diagram of embodiments of the network node 110. In some embodiments, the network node 110 may comprise a transmitting module 601, a receiving module 602, and a processor 610. The transmitting module 610 may also be referred to as transmitter or transmitting unit, while the receiving module 602 may also be referred to as a receiver or receiving unit. The processor 610 may also be referred to as processing module, processing unit or processing circuitry, and may control the transmitting module 601 and the receiving module 602. Optionally, the processor 610 may said to comprise one or more of the transmitting module 601 and the receiving module 602, and/or perform the function thereof as described below.

The processor 610 is configured to obtain information about a first and a second wireless device 121, 122 in the wireless communications network 100 indicating that the first and the second wireless device 121, 122 are capable of communicating using any one of a set of at least three communication modes comprising at least a cellular communication mode, a D2D HD communication mode, and a D2D FD communication mode, and to select, from the set of at least three communication modes, one of the communication modes for a communication between the first and second wireless devices 121, 122 when at least one criterion on a capability of the first and second wireless device 121 associated with one of the communication modes is met, and/or at least one criterion on an operational capability of the network node 110 associated with one of the communication modes is met. Also, the transmitting module 601 is configured to transmit information about the selected communication mode for the communication between the first and second wireless devices 121, 122 to at least one of the first and second wireless devices 121, 122.

In some embodiments, the processor 610 is further configured to obtain the information by retrieving the information about the first and second wireless device 121, 122 from historical data or stored information in the network node 110. Alternatively, the receiving module 602 may be configured to receive the information about the first and second wireless device 121, 122 from the first and/or the second wireless device 121, 122 and/or receive the information about the first and second wireless device 121, 122 from another network node in the wireless communications network 100.

In some embodiments, the processor 610 is further configured to select the D2D FD communication mode as the communication mode for the communication between the first and second wireless devices 121, 122 when at least one criterion on the capability of the first and second wireless device 121, 122 associated with the D2D FD communication mode is met. The criterion on the capability of the first and second wireless device 121, 122 referred to here are described in the corresponding method above.

In some embodiments, the processor 610 is further configured to select the D2D FD communication mode as the communication mode for the communication between the first and second wireless devices 121, 122 when at least one criterion on the operational capability of the network node 110 associated with the D2D FD communication mode is met. The criterion on the operational capability of the network node 110 referred to here are described in the corresponding method above.

In some embodiments, the processor 610 is further configured to determine to use overlapping or non-overlapping cellular transmission resources for the communication between the first and second wireless device 121, 122 in the D2D full-duplex communication mode based on the amount of traffic and/or system load in the network node 110.

The embodiments for selecting a communication mode in a wireless communications network 100 may be implemented through one or more processors, such as, e.g. the processor 610 in the network node 110 depicted in FIG. 6, together with computer program code for performing the functions and actions of the embodiments herein. The program code mentioned above may also be provided as a computer program product, for instance in the form of a data carrier carrying computer program code or code means for performing the embodiments herein when being loaded into the processor 610 in the network node 110. The computer program code may e.g. be provided as pure program code in the network node 110 or on a server and downloaded to the network node 110. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

Thus, the network node 110 may further comprise a memory 620, which may be referred to or comprise one or more memory modules or units. The memory 620 may be arranged to be used to store executable instructions and data to perform the methods described herein when being executed in the processor 610 of the network node 110. Those skilled in the art will also appreciate that the processor 610 and the memory 620 described above may refer to a combination of analog and digital circuits, and/or one or more processors configured with software and/or firmware, e.g. stored in the memory 620, that when executed by the one or more processors, such as, the processor 610, cause the one or more processors to perform the method as described above. The processor 610 and the memory 620 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 610, cause the at least one processor to carry out the method for selecting a communication mode in a wireless communications network 100. Also, some embodiments may further comprise a carrier containing said computer program product, wherein the carrier is one of an electronic signal, optical signal, radio signal, or computer readable storage medium.

Figure 7:
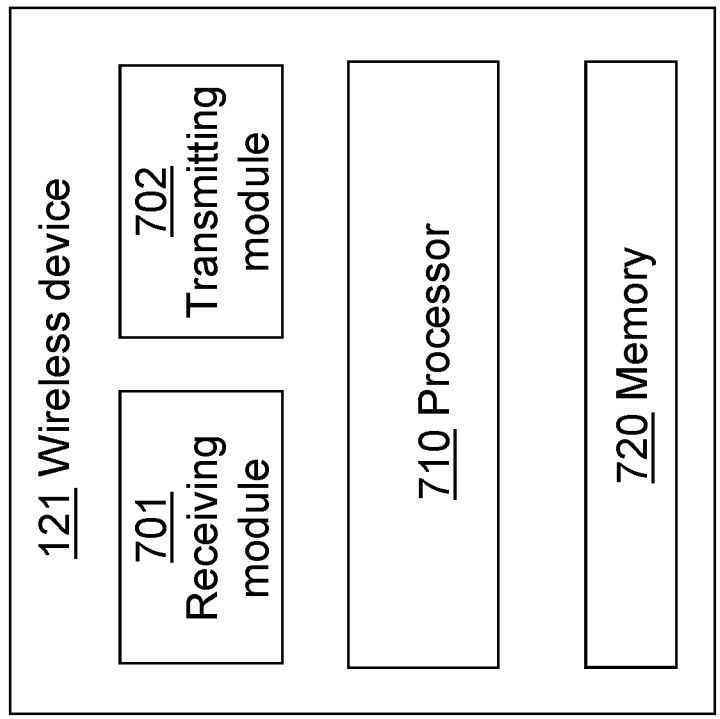
FIG. 7 is a schematic block diagram depicting embodiments of a wireless device.

To perform the method actions in the first wireless device 121 for selecting a communication mode for a communication with a second wireless device 122 in a wireless communications network 100, the first wireless device 121 may comprise the following arrangement depicted in FIG. 7.

FIG. 7 shows a schematic block diagram of embodiments of the first wireless device 121. In some embodiments, the first wireless device 121 may comprise a receiving module 701, a transmitting module 702, and a processor 710. The transmitting module 710 may also be referred to as transmitter or transmitting unit, while the receiving module 702 may also be referred to as a receiver or receiving unit. The processor 710 may also be referred to as processing module, processing unit or processing circuitry, and may control the transmitting module 701 and the receiving module 702. Optionally, the processor 710 may comprise one or more of the transmitting module 701 and the receiving module 702, and/or perform the function thereof as described below.

The processor 710 is configured to obtain information indicating that the second wireless device 122 is capable of communicating using any one of a set of at least three communication modes comprising at least a cellular communication mode, a D2D HD communication mode, and a D2D FD communication mode. In some embodiments, this may be performed by the receiver 701 being configured to receive the information from the second wireless device 122. Alternatively, this may be performed by the receiver 701 being configured to receive the information from a network node 110, or by retrieve the information stored in the memory of the first wireless device 121.

The processor 710 is also configured to select, from the set of at least three communication modes, one of the communication modes for the communication with the second wireless device 122 when at least one criterion on a capability of the first and second wireless device 121 associated with one of the communication modes is met, and/or at least one criterion on an operational capability of a network node 110 serving the first wireless device 121 in the wireless communications network 100 associated with one of the communication modes is met. The processor 710 is also configured to perform the communication with the second wireless device 122 using the selected communication mode.

In some embodiments, the processor 710 may be further configured to select the D2D full-duplex communication mode as the communication mode for the communication between the first and second wireless devices 121, 122 when at least one criterion on the capability of the first and second wireless device 121 associated with the D2D full-duplex communication mode is met. The criterion on the capability of the first and second wireless device 121, 122 referred to here are described in the corresponding method above.

In some embodiments, the receiver 701 may be further configured to receive one or more operational capabilities from a network node 110 serving at least the first wireless device 121 in the wireless communications network 100. In this case, the processor 710 may be further configured to select the D2D full-duplex communication mode as the communication mode for the communication between the first and second wireless devices 121, 122 when at least one criterion on the operational capability of the network node 110 associated with the D2D full-duplex communication mode is met. The criterion on the operational capability of the network node 110 referred to here are described in the corresponding method above.

In some embodiments, the transmitter 702 may be configured to transmit, to a network node 110 serving at least the first wireless device 121 in the wireless communications network 100, information indicating that the first and the second wireless device 121, 122 are capable of communicating using any one of a set of at least three communication modes comprising at least a cellular communication mode, a D2D half-duplex communication mode, and a D2D full-duplex communication mode.

In some embodiments, the transmitter 702 may be further configured to transmit to a network node 110 serving at least the first wireless device 121 in the wireless communications network 100, information indicating that one of the communication modes in the set of at least three communication modes has been selected. In this case, the receiver 701 may be further configured to receive from the network node 110, information indicating that one of the communication modes in the set of at least three communication modes has been selected for the communication with the second wireless device 122. Here, the processor 710 may be further configured to determine a communication mode for the communication with the second wireless device 122 based on the communication mode selected by the first wireless device 121 and the information about the selected communication mode received from the network node 110. Furthermore, in this case, the receiver 701 may be further configured to receive, from a network node 110 serving the first wireless device 121 in the wireless communication network 100, information indicating that the first wireless device 121 is allowed to determine a communication mode.

In some embodiments, the transmitter 702 may be further configured to transmit to a network node 110 serving at least the first wireless device 121 in the wireless communications network 100, information indicating that the D2D FD communication mode has been selected by the first wireless device 121, whereby the receiver 701 may be further configured to receive, from the network node 110, information indicating that the D2D FD communication mode has been selected by the network node 110 for the communication with the second wireless device 122.

The embodiments for selecting a communication mode for a communication with a second wireless device 122 in a wireless communications network 100 may be implemented through one or more processors, such as, e.g. the processor 710 in the first wireless device 121 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processor 710 in the first wireless device 121. The computer program code may e.g. be provided as pure program code in the first wireless device 121 or on a server and downloaded to the first wireless device 121. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blue-ray disc, etc.

Thus, the first wireless device 121 may further comprise a memory 720, which may be referred to or comprise one or more memory modules or units. The memory 720 may be arranged to be used to store executable instructions and data to perform the methods described herein when being executed in the processor 710 of the first wireless device 121. Those skilled in the art will also appreciate that the processor 710 and the memory 720 described above may refer to a combination of analog and digital circuits, and/or one or more processors configured with software and/or firmware, e.g. stored in the memory 720, that when executed by the one or more processors, such as, the processor 710, cause the one or more processors to perform the method as described above. The processor 710 and the memory 720 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processor 710, cause the at least one processor to carry out the method for selecting a communication mode for a communication with a second wireless device 122 in a wireless communications network 100. Also, some embodiments may further comprise a carrier containing said computer program product, wherein the carrier is one of an electronic signal, optical signal, radio signal, or computer readable storage medium.

The terminology used in the detailed description of the particular embodiments illustrated in the accompanying drawings is not intended to be limiting of the described methods, the network node 110 and the first wireless device 121, which instead should be construed in view of the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

Abbreviations

A-GNSS Assisted GNSS
AP Access Point
BS Base Station
D2D Device-to-Device
FD Full Duplex
FDD Frequency Division Duplex
GNSS Global navigational satellite system
HD Half Duplex
LTE Long Term Evolution
MS Mode Switching
MCS Modulation and Coding Scheme
NW Network
OTDOA Observed time difference of arrival
PRB PHY resource block
QoS Quality of Service
RA Resource Allocation
RAN Radio Access Network
TDD Time Division Duplex
UE User Equipment

The invention claimed is:

1. A method performed by a network node for selecting a communication mode in a wireless communications network, the method comprising
obtaining information about a first and a second wireless device in the wireless communications network indicating that the first and the second wireless device are capable of communicating using any one of a set of at least three communication modes comprising at least a cellular communication mode, a Device-to-Device (D2D) half-duplex communication mode, and a D2D full-duplex communication mode, wherein the first and second wireless device register their duplexing capabilities comprising at least one of self-interference suppressing capability, maximum transmit power in D2D FD mode, and supported Modulation and Coding Schemes, MCS, in D2D FD mode;
selecting, from the set of at least three communication modes, one of the communication modes for a communication between the first and second wireless devices when at least one criterion on a capability of the first and second wireless device associated with one of the communication modes is met, and/or at least one criterion on an operational capability of the network node associated with one of the communication modes is met, wherein the selecting further comprises selecting the D2D full-duplex communication mode as the communication mode for the communication between the first and second wireless devices when at least one criterion on the capability of the first and second wireless device associated with the D2D full-duplex communication mode is met and when at least one criterion on the operational capability the network node associated with the D2D full-duplex communication mode is met, wherein the operational capability of the network node associated with the D2D full-duplex communication mode is the number of carrier frequencies available for D2D communication, and wherein one of the at least one criterion is met when the number of carrier frequencies available for D2D communication is above a determined threshold value; and transmitting information about the selected communication mode for the communication between the first and second wireless devices to at least one of the first and second wireless devices, wherein the capability of the first and second wireless device associated with the D2D full-duplex communication mode is a value indicative of the distance between the first and second wireless device, and wherein one of the at least one criterion is met when the value indicative of the distance is below a determined threshold value.

2. The method of claim 1, wherein obtaining is performed by one or more of: receiving the information about the first and second wireless device from the first and/or the second wireless device, receiving the information about the first and second wireless device from another network node in the wireless communications network, and retrieving the information about the first and second wireless device from historical data or stored information in the network node.

3. The method of claim 1, wherein the capability of the first and second wireless device associated with the D2D full-duplex communication mode is a self-interference mitigation capability of the first and second wireless device, and wherein one of the at least one criterion is met when both the first and second wireless device have a self-interference mitigation capability which enables a D2D full-duplex communication mode.

4. The method of claim 1, wherein the capability of the first and second wireless device associated with the D2D full-duplex communication mode is a path loss or signal strength value for a D2D communication between the first and second wireless device, and wherein one of the at least one criterion is met when the path loss or signal strength value is above a determined threshold value.

5. The method of claim 1, wherein the capability of the first and second wireless device associated with the D2D full-duplex communication mode is a path loss or signal strength value towards the network node, and wherein one of the at least one criterion is met when the path loss or signal strength value is above a determined threshold value.

6. The method of claim 1, wherein the capability of the first and second wireless device associated with the D2D full-duplex communication mode is one or more values indicative of the remaining battery power level of the first and/or second wireless device, and wherein one of the at least one criterion is met when the one or more values indicative of the remaining battery power level is above a determined threshold value.

7. The method of claim 1, wherein the capability of the first and second wireless device associated with the D2D full-duplex communication mode is a communication mode which is recommended by at least the first wireless device for the communication between the first and second wireless devices, and wherein one of the at least one criterion is met when the recommended communication mode is the D2D full-duplex communication mode.

8. The method of claim 1, further comprising determining to use overlapping or non-overlapping cellular transmission resources for the communication between the first and second wireless device in the D2D full-duplex communication mode based on the amount of traffic and/or system load in the network node.

9. The method of claim 1, wherein the operational capability of the network node associated with the D2D full-duplex communication mode is the number of D2D communications handled by network node, and wherein one of the at least one criterion is met when the number of D2D communications handled by network node is above a determined threshold value.

10. A network node for selecting a communication mode in a wireless communications network, the network node comprising:

a processor configured to obtain information about a first and a second wireless device in the wireless communications network indicating that the first and the second wireless device are capable of communicating using any one of a set of at least three communication modes comprising at least a cellular communication mode, a Device-to-Device (D2D) half-duplex communication mode, and a D2D full-duplex communication mode, wherein the first and second wireless device register their duplexing capabilities comprising at least one of self-interference suppressing capability, maximum transmit power in D2D FD mode, and supported Modulation and Coding Schemes, MCS, in D2D FD mode; and to select, from the set of at least three communication modes, one of the communication modes for a communication between the first and second wireless devices when at least one criterion on a capability of the first and second wireless device associated with one of the communication modes is met, and/or at least one criterion on an operational capability of the network node associated with one of the communication modes is met, wherein the processor is further configured to select the D2D full-duplex communication mode as the communication mode for the communication between the first and second wireless devices when at least one criterion on the capability of the first and second wireless device associated with the D2D full-duplex communication mode is met and when at least one criterion on the operational capability the network node associated with the D2D full-duplex communication mode is met, wherein the operational capability of the network node associated with the D2D full-duplex communication mode is the number of carrier frequencies available for D2D communication, and wherein one of the at least one criterion is met when the number of carrier frequencies available for D2D communication is above a determined threshold value; and a transmitter configured to transmit information about the selected communication mode for the communication between the first and second wireless devices to at least one of the first and second wireless devices, wherein the capability of the first and second wireless device associated with the D2D full-duplex communication mode is a value indicative of the distance between the first and second wireless device, and wherein one of the at least one criterion is met when the value indicative of the distance is below a determined threshold value.

11. The network node of claim 10, wherein the processor is further configured to obtain the information by retrieving the information about the first and second wireless device from historical data or stored information in the network node, or wherein the network node further comprise a receiver configured to receive the information about the first and second wireless device from the first and/or the second wireless device and/or receive the information about the first and second wireless device from another network node in the wireless communications network.

12. The network node of claim 10, wherein the capability of the first and second wireless device associated with the D2D full-duplex communication mode is a self-interference mitigation capability of the first and second wireless device, and wherein one of the at least one criterion is met when both the first and second wireless device have a self-interference mitigation capability which enables a D2D full-duplex communication mode.

13. The network node of claim 10, wherein the capability of the first and second wireless device associated with the D2D full-duplex communication mode is a path loss or signal strength value for a D2D communication between the first and second wireless device, and wherein one of the at least one criterion is met when the path loss or signal strength value is above a determined threshold value.

14. The network node of claim 10, wherein the capability of the first and second wireless device associated with the D2D full-duplex communication mode is a path loss or signal strength value towards the network node, and wherein one of the at least one criterion is met when the path loss or signal strength value is above a determined threshold value.

15. The network node of claim 10, wherein the capability of the first and second wireless device associated with the D2D full-duplex communication mode is one or more values indicative of the remaining battery power level of the first and/or second wireless device, and wherein one of the at least one criterion is met when the one or more values indicative of the remaining battery power level is above a determined threshold value.

16. The network node of claim 10, wherein the capability of the first and second wireless device associated with the D2D full-duplex communication mode is a communication mode which is recommended by at least the first wireless device for the communication between the first and second wireless devices, and wherein one of the at least one criterion is met when the recommended communication mode is the D2D full-duplex communication mode.

17. The network node of claim 10, wherein the operational capability of the network node associated with the D2D full-duplex communication mode is the number of D2D communications handled by network node, and wherein one of the at least one criterion is met when the number of D2D communications handled by network node is above a determined threshold value.

18. The network node of claim 10, wherein the processor is further configured to determine to use overlapping or non-overlapping cellular transmission resources for the communication between the first and second wireless device in the D2D full-duplex communication mode based on the amount of traffic and/or system load in the network node.

19. The network node of claim 10, further comprising a memory wherein said memory is containing instructions executable by said processor.

20. A method performed by a first wireless device for selecting a communication mode for a communication with a second wireless device in a wireless communications network, the method comprising:

obtaining information indicating that the second wireless device is capable of communicating using any one of a set of at least three communication modes comprising at least a cellular communication mode, a Device-to-Device (D2D) half-duplex communication mode, and a D2D full-duplex communication mode, wherein the obtaining further comprises one or more of: receiving said information from the second wireless device; receiving said information from a network node; and retrieving said information stored in the memory of the first wireless device;

selecting, from the set of at least three communication modes, one of the communication modes for the communication with the second wireless device when at least one criterion on a capability of the first and second wireless device associated with one of the communication modes is met, and/or at least one criterion on an operational capability of a network node serving the first wireless device in the wireless communications network associated with one of the communication modes is met, wherein the operational capability of the network node associated with the D2D full-duplex communication mode is the number of carrier frequencies available for D2D communication, and wherein one of the at least one criterion is met when the number of carrier frequencies available for D2D communication is above a determined threshold value and wherein the first and second wireless device register their duplexing capabilities comprising at least one of self-interference suppressing capability, maximum transmit power in D2D FD mode, and supported Modulation and Coding Schemes, MCS, in D2D FD mode; and performing the communication with the second wireless device using the selected communication mode, wherein the capability of the first and second wireless device associated with the D2D full-duplex communication mode is a value indicative of the distance between the first and second wireless device, and wherein one of the at least one criterion is met when the value indicative of the distance is below a determined threshold value.

21. The method of claim 20, wherein the selecting further comprises transmitting, to a network node serving at least the first wireless device in the wireless communications network, information indicating that the first and the second wireless device are capable of communicating using any one of a set of at least three communication modes comprising at least a cellular communication mode, a D2D half-duplex communication mode, and a D2D full-duplex communication mode.

22. The method of claim 20, wherein the capability of the first and second wireless device associated with the D2D full-duplex communication mode is a path loss or signal strength value for a D2D communication between the first and second wireless device, and wherein one of the at least one criterion is met when the path loss or signal strength value is above a determined threshold value.

23. The method of claim 20, wherein the capability of the first and second wireless device associated with the D2D full-duplex communication mode is a path loss or signal strength value towards the network node, and wherein one of the at least one criterion is met when the path loss or signal strength value is above a determined threshold value.

24. The method of claim 20, wherein the capability of the first and second wireless device associated with the D2D full-duplex communication mode is one or more values indicative of the remaining battery power level of the first and/or second wireless device, and wherein one of the at least one criterion is met when the one or more values indicative of the remaining battery power level is above a determined threshold value.

25. The method of claim 20, wherein the selecting further comprises selecting the D2D full-duplex communication mode as the communication mode for the communication between the first and second wireless devices when at least one criterion on the capability of the first and second wireless device associated with the D2D full-duplex communication mode is met.

26. The method of claim 25, wherein the capability of the first and second wireless device associated with the D2D full-duplex communication mode is a self-interference mitigation capability of the first and second wireless device, and wherein one of the at least one criterion is met when both the first and second wireless device have a self-interference mitigation capability which enables a D2D full-duplex communication mode.

27. The method of claim 20, wherein the operational capability of the network node associated with the D2D full-duplex communication mode is the number of D2D communications handled by network node, and wherein one of the at least one criterion is met when the number of D2D communications handled by network node is above a determined threshold value.

28. The method of claim 20, wherein the selecting further comprises
transmitting, to a network node serving at least the first wireless device in the wireless communications network, information indicating that one of the communication modes in the set of at least three communication modes has been selected;
receiving, from the network node, information indicating that one of the communication modes in the set of at least three communication modes has been selected for the communication with the second wireless device;
determining a communication mode for the communication with the second wireless device based on the communication mode selected by the first wireless device and the information about the selected communication mode received from the network node.

29. The method of claim 28, wherein the selecting further comprises receiving from a network node serving the first wireless device in the wireless communication network information indicating that the first wireless device is allowed to perform the determining.

30. The method of claim 20, wherein the selecting further comprises
transmitting, to a network node serving at least the first wireless device in the wireless communications network, information indicating that the D2D full-duplex communication mode has been selected by the first wireless device;
receiving, from the network node, information indicating the D2D full-duplex communication mode has been selected by the network node for the communication with the second wireless device.

31. A first wireless device for selecting a communication mode for a communication with a second wireless device in a wireless communications network, the first wireless device comprising
a processor configured to
obtain information indicating that the second wireless device is capable of communicating using any one of a set of at least three communication modes comprising at least a cellular communication mode, a Device-to-Device (D2D) half-duplex communication mode, and a D2D full-duplex communication mode, wherein the first and second wireless device register their duplexing capabilities comprising at least one of self-interference suppressing capability, maximum transmit power in D2D FD mode, and supported Modulation and Coding Schemes, MCS, in D2D FD mode;
select, from the set of at least three communication modes, one of the communication modes for the communication with the second wireless device when at least one criterion on a capability of the first and second wireless device associated with one of the communication modes is met, and/or at least one criterion on an operational capability of a network node serving the first wireless device in the wireless communications network associated with one of the communication modes is met, wherein the processor is further configured to select the D2D full-duplex communication mode as the communication mode for the communication between the first and second wireless devices when at least one criterion on the capability of the first and second wireless device associated with the D2D full-duplex communication mode is met and when at least one criterion on the operational capability the network node associated with the D2D full-duplex communication mode is met, wherein the operational capability of the network node associated with the D2D full-duplex communication mode is the number of carrier frequencies available for D2D communication, and wherein one of the at least one criterion is met when the number of carrier frequencies available for D2D communication is above a determined threshold value; and
perform the communication with the second wireless device using the selected communication mode,
wherein the capability of the first and second wireless device associated with the D2D full-duplex communication mode is a value indicative of the distance between the first and second wireless device, and wherein one of the at least one criterion is met when the value indicative of the distance is below a determined threshold value.

32. The first wireless device of claim 31, further comprising a receiver configured to receive said information from the second wireless device, receive said information from a network node, and/or retrieve said information stored in the memory of the first wireless device.

33. The first wireless device of claim 31, wherein the capability of the first and second wireless device associated with the D2D full-duplex communication mode is a self-interference mitigation capability of the first and second wireless device, and wherein one of the at least one criterion is met when both the first and second wireless device have a self-interference mitigation capability which enables a D2D full-duplex communication mode.

34. The first wireless device of claim 31, wherein the capability of the first and second wireless device associated with the D2D full-duplex communication mode is a path loss or signal strength value for a D2D communication between the first and second wireless device, and wherein one of the at least one criterion is met when the path loss or signal strength value is above a determined threshold value.

35. The first wireless device of claim 31, wherein the capability of the first and second wireless device associated with the D2D full-duplex communication mode is a path loss or signal strength value towards the network node, and wherein one of the at least one criterion is met when the path loss or signal strength value is above a determined threshold value.

36. The first wireless device of claim 31, wherein the capability of the first and second wireless device associated with the D2D full-duplex communication mode is one or more values indicative of the remaining battery power level of the first and/or second wireless device, and wherein one of the at least one criterion is met when the one or more values indicative of the remaining battery power level is above a determined threshold value.

37. The first wireless device of claim 31, wherein the operational capability of the network node associated with the D2D full-duplex communication mode is the number of D2D communications handled by network node, and wherein one of the at least one criterion is met when the number of D2D communications handled by network node is above a determined threshold value.

38. The first wireless device of claim 31, further comprising a transmitter configured to transmit, to a network node serving at least the first wireless device in the wireless communications network, information indicating that the first and the second wireless device are capable of communicating using any one of a set of at least three communication modes comprising at least a cellular communication mode, a D2D half-duplex communication mode, and a D2D full-duplex communication mode.

39. The first wireless device of claim 31, wherein the transmitter is further configured to transmit to a network node serving at least the first wireless device in the wireless communications network, information indicating that one of the communication modes in the set of at least three communication modes has been selected, the receiver is further configured to receive from the network node, information indicating that one of the communication modes in the set of at least three communication modes has been selected for the communication with the second wireless device, and the processor is further configured to determine a communication mode for the communication with the second wireless device based on the communication mode selected by the first wireless device and the information about the selected communication mode received from the network node.

40. The first wireless device of claim 39, wherein the receiver is further configured to receive, from a network node serving the first wireless device in the wireless communication network, information indicating that the first wireless device is allowed to determine a communication mode.

41. The first wireless device of claim 31, wherein the transmitter is further configured to transmit to a network node serving at least the first wireless device in the wireless communications network, information indicating that the D2D full-duplex communication mode has been selected by the first wireless device, and the receiver is further configured to receive, from the network node, information indicating the D2D full-duplex communication mode has been selected by the network node for the communication with the second wireless device.

42. The first wireless device of claim 31, further comprising a memory wherein said memory is containing instructions executable by said processor.

* * * * *